Feb. 28, 1961     J. M. MILLER     2,973,052
MECHANIC'S PORTABLE STEP
Filed Oct. 30, 1958
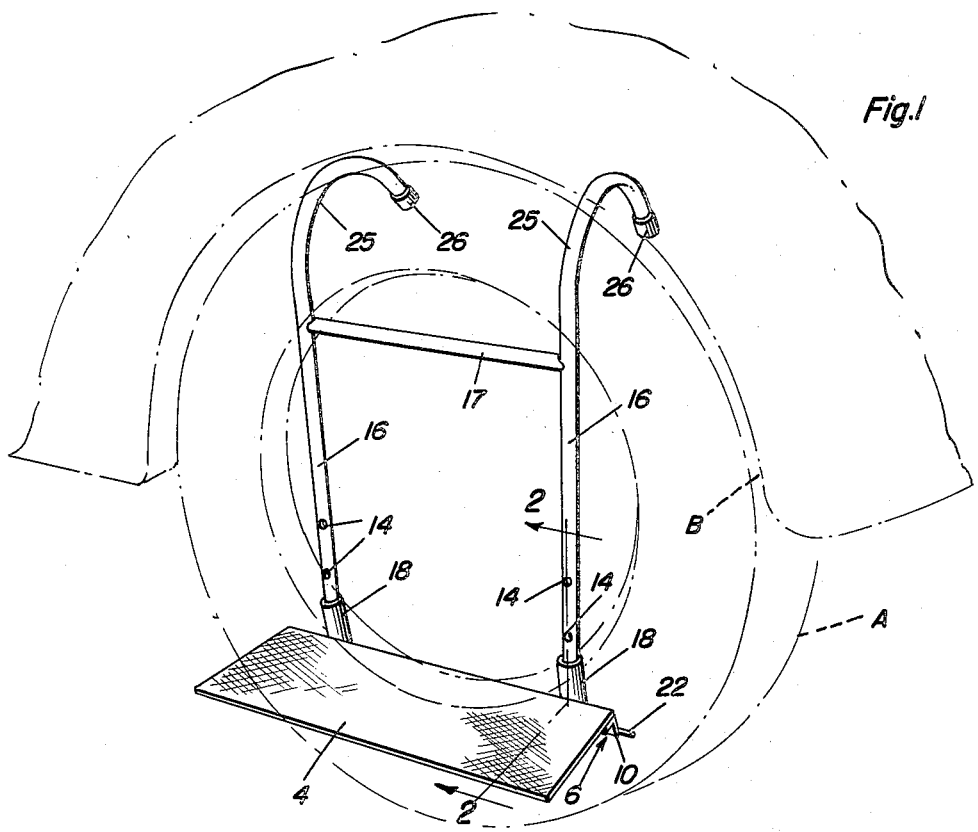
Fig.1
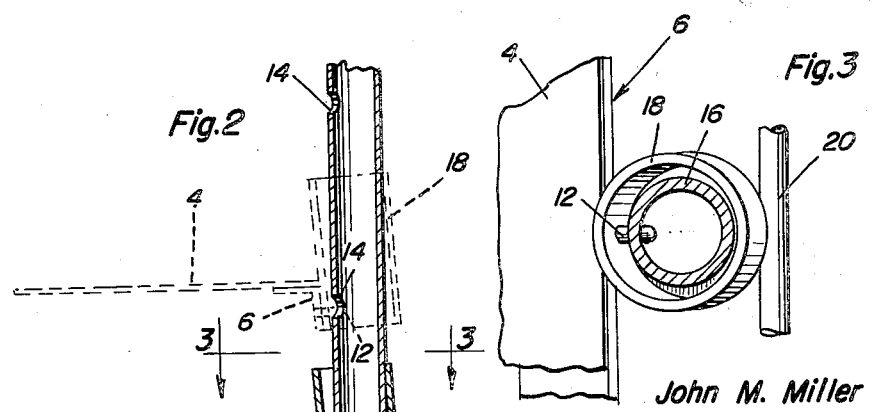
Fig.2
Fig.3
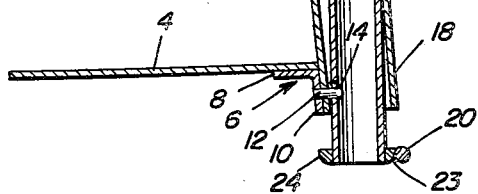
John M. Miller
INVENTOR.

United States Patent Office 2,973,052
Patented Feb. 28, 1961

2,973,052

MECHANIC'S PORTABLE STEP

John M. Miller, Box 711, Blytheville, Ark.

Filed Oct. 30, 1958, Ser. No. 770,753

2 Claims. (Cl. 182—150)

The present invention relates to an improved portable step which is expressly designed and adapted to be temporarily attached to and suspended from a wheel on a truck so that a mechanic or other repairman may support himself in a position elevated above the garage floor or other surface and so that he may conveniently reach over the fender to attend to a given repair job that might be virtually inaccessible and unhandy to take care of.

Whereas under ordinary working conditions a mechanic may stand on the garage floor or other foundation, bend over the fender and reach in under the hood from one side of the vehicle, when the work requirements have to do with trucks, tractors and vehicles in the large category the working conditions of the mechanic are greatly impeded. This problem has, however, been recognized for quite some time and, under such circumstances, many inventors working in this line of endeavor and hoping to aptly and acceptably solve the problem have proposed the use of special ladders, scaffolds, platforms and in some instances readily applicable and removable portable repair steps. As a matter of fact, a number of wheel-suspended steps have been devised and recommended for use. Reference, for example, might well be made to the mechanic's vehicle repair step disclosed in a patent to Anderson, identified as 2,378,678. In carrying out his ideas Anderson found it feasible and practical to utilize a simple horizontal step and to provide the same with brackets and suitable braces forming a twin-hook hanger or harness and he hangs the hooks over the peripheral or tread portion of the tire of the vehicle wheel.

It is an object of the instant invention to structurally, functionally and otherwise improve on Anderson and any similarly constructed and performing prior art adaptations and, in doing so, to offer to members of the public an acceptable construction, a construction which is such that it will satisfy the manufacturing requirements and economies of manufacturers.

In carrying out a preferred embodiment of the invention a simple, economical and practical frame is provided. This frame embodies a pair of brace-connected uprights having hooks at their upper ends to engage releasably over the tread of a wheel tire. A step is provided along an inner longitudinal edge with vertical longitudinally spaced sleeves and the sleeves are slidably and adjustably mounted on the uprights of the frame. There is a brace attached to the lower end portions of the frame uprights and this is designed and adapted to rest against the outer side of a tire in a manner to stabilize the suspended position of the over-all attachment.

Other objects, features and advantages will become more readily apparent from the following description and the accompanying drawing.

In the drawing, wherein like numerals are employed to designate like parts throughout the views:

Fig. 1 is a perspective view of a step attachment or portable step construction constructed in accordance with the principles of the invention and showing how it is intended to be used;

Fig. 2 is a section on a larger scale taken on the plane of the vertical line 2—2 of Fig. 1, looking in the direction of the arrows; and Fig. 3 is a horizontal section on the line 3—3 of Fig. 2.

Referring now to the drawing the step per se comprises a board, metal plate or the like which is generally rectangular in form and is similar to platforms employed in an analogous way by others working in the art. This step is denoted by the numeral 4 and preferably has a milled or suitably roughened tread surface providing the desired anti-skid needs. An angle iron 6 is provided and this angle iron has its upper flange 8 welded or otherwise secured to the bottom surface of the step and flush therewith and the depending or vertical flange 10 is provided at longitudinally spaced points with attached studs which project laterally and provide keeper pins 12. These keeper pins are selectively engageable with keeper holes 14 provided in the forward side surfaces of the tubular frame members or aforementioned uprights 16. Using a series of keeper holes makes it possible to raise and lower and obtain the desired elevation depending, of course, on the needs of the mechanic or other user of the step. In order to satisfactorily accomplish the desired result and to do so in a practical and reliable manner the flanged inner longitudinal edge portion of the step is slidingly and adjustably mounted on the members 16. More specifically, a sleeve 18 is mounted in the manner shown in the drawing and the keeper pin cooperable therewith passes through an opening provided therefor in the sleeve and is thus exposed for cooperation with any one of the several keeper holes 16 in the manner illustrated in full and phantom lines in Fig. 2. It will be noticed that the diameter of each sleeve is appreciably greater than the cross-section or diameter of the upright on which it is mounted and this construction allows the sleeve to cant and assume the angular position illustrated. The use of large diametered sleeves permits the keeper pins to be engaged and released and allows the sleeve to slide up and down without hindrance. Obtaining height adjustment has always been one of the objections to competitive and prior art constructions and after a mechanic uses the construction herein shown and described he will promptly conclude that it is such that it is a proper answer to the problem, so to speak. A further improvement resides in the brace means for the frame unit and step unit. This construction comprises a simple horizontal rod 20. The rod extends the full length of the flanged step and as a matter of fact has end portions 22 projecting beyond the end portions of the angle iron 12. The rod is welded as at 23 to the collars 24 on the lower end of the uprights. It follows that the over-all construction, therefore, comprises a frame made up of tubular parts or uprights 16 joined by a cross brace 17 and with the upper ends 25 formed into hooks and provided with appropriate tips 26. These hooks are adapted to be engaged over the wheel tire A in the manner shown, that is between the tire and the underneath side of the cooperating fender B. The step unit comprises the shelf-like step 4 reinforced along the edge with the angle iron 6 and with the angle iron having lower end portions of the large easy sliding sleeves 18 welded or otherwise secured thereto. The sleeves in conjunction with the flange 10 carry the detent or keeper pins 12 which cooperate with the selectively usable keeper holes 14. Thus the user may readily attach the hanger frame to assume the suspended and braced position seen in Fig. 1 thus providing a reliable hanger for the vertically regulable step.

With the construction herein shown a user thereof may easily fit the hooks 25 of the frame unit in position, adjust the step to the desired elevation and thus provide for himself a platform through the medium of which he may elevate himself and conveniently and comfortably bend over the fender and reach parts of the engine beneath the elevated hood (not detailed). Experience has shown time and again that when in use the novel step construction makes hard places easy to reach. It offers the user three adjustable height positions.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A readily attachable and detachable mechanic's step attachment for truck wheel comprising a frame embodying a pair of coplanar spaced parallel uprights having their upper ends formed with attaching and suspending hooks, the upper end portions of said uprights being joined by a cross brace located between said upper end portions, the lower ends of said uprights being provided with collars, a support bracing and abutment rod member having end portions rigidly attached to the respective collars and having terminal portions projecting outwardly beyond the adjacent respective uprights and adapted to bear firmly against a tire surface, a pair of oversize freely slidable sleeves, one sleeve slidably mounted on each upright, said uprights being provided with vertically spaced keeper holes, a step at right angles to and spanning the space between the lower end portions of said uprights, said step being provided on an underside of one lengthwise edge portion with an angle iron, said angle iron being commensurate in length with the length of said step and having a depending vertical flange, said vertical flange being flush with said lengthwise edge and having keeper pins fixedly mounted, said keeper pins extending inwardly through openings provided therefor in their respective sleeves and being adapted to be releasably connected with the keeper holes.

2. A portable mechanic's step which may be readily connected to or disconnected from a tire on a truck wheel comprising a frame having uprights with hooks at their upper ends to engage over the tire, said uprights being provided with longitudinally spaced selectively usable keeper holes, sleeves slidable vertically on the uprights, said sleeves being each of a diameter appreciably greater than the upright on which it is slidable to permit the sleeve to cant and to allow the sleeve to be slid when manually adjusted up and down on the upright, the upper end portions of said uprights being rigidly interconnected by a cross brace secured between said upper end portions, a support bracing and abutment rod member having end portions rigidly attached to the lower end portions of said uprights and having terminal portions projecting outwardly beyond the adjacent respective uprights and adapted to bear firmly against a tire surface and comprise stops to limit downward movement of said sleeves on said uprights, a step rigidly interconnecting said sleeves, said step being provided with outstanding pins and said pins constituting keepers and being releasably engageable with their intended keeper holes.

References Cited in the file of this patent

UNITED STATES PATENTS

| 907,501 | Jarret | Dec. 22, 1908 |
| 1,307,468 | Wells | June 24, 1919 |
| 2,378,678 | Anderson | June 19, 1945 |
| 2,575,503 | Warren | Nov. 20, 1951 |
| 2,848,150 | Tans | Aug. 19, 1958 |

FOREIGN PATENTS

| 3,481 | Great Britain | Feb. 11, 1913 |